US011537691B2

(12) United States Patent
Zeh et al.

(10) Patent No.: US 11,537,691 B2
(45) Date of Patent: Dec. 27, 2022

(54) CONTROLLER AREA NETWORK TRAFFIC FLOW CONFIDENTIALITY

(71) Applicant: Infineon Technologies AG, Neubiberg (DE)

(72) Inventors: Alexander Zeh, Munich (DE); Laurent Heidt, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 387 days.

(21) Appl. No.: 16/805,495

(22) Filed: Feb. 28, 2020

(65) Prior Publication Data

US 2021/0271739 A1 Sep. 2, 2021

(51) Int. Cl.
*G06F 21/30* (2013.01)
*H04L 12/40* (2006.01)
*H04L 69/324* (2022.01)
*H04L 69/326* (2022.01)

(52) U.S. Cl.
CPC .............. *G06F 21/30* (2013.01); *H04L 12/40* (2013.01); *H04L 69/324* (2013.01); *H04L 69/326* (2013.01); *H04L 2012/40215* (2013.01)

(58) Field of Classification Search
None
See application file for complete search history.

(56) References Cited

U.S. PATENT DOCUMENTS

| 6,886,103 B1* | 4/2005 | Brustoloni | H04L 61/2564 713/160 |
|---|---|---|---|
| 7,000,120 B1* | 2/2006 | Koodli | H04L 69/22 713/153 |
| 7,746,781 B1* | 6/2010 | Xiang | H04L 1/08 370/235 |
| 2001/0040895 A1* | 11/2001 | Templin | H04L 61/2557 370/466 |
| 2009/0322766 A1* | 12/2009 | Marien | G06F 21/606 345/520 |
| 2016/0219024 A1* | 7/2016 | Verzun | H04L 63/102 |

(Continued)

OTHER PUBLICATIONS

Introduction to the Controller Area Network (CAN), author: Steve Corrigan, revised: May 2016 (Year: 2016).*

(Continued)

*Primary Examiner* — Charles C Jiang
*Assistant Examiner* — Biswajit Ghose
(74) *Attorney, Agent, or Firm* — Harrity & Harrity, LLP

(57) ABSTRACT

A transmitter device of a bus-based communication system may add one or more padding bits, associated with providing traffic flow confidentiality for communication of a payload on a communication bus, either to the payload on a transport layer, or to one or more first frames on a data link layer. The one or more first frames may include a transport layer payload associated with the payload. The transmitter device may transmit one or more second frames, including a data link layer payload associated with the one or more first frames, on the communication bus. A receiver device of the bus-based communication system may receive the one or more second frames on the communication bus. The receiver device may process the one or more padding bits from either the one or more first frames on the data link layer, or from the payload on the transport layer.

20 Claims, 8 Drawing Sheets

(56) References Cited

U.S. PATENT DOCUMENTS

| | | | |
|---|---|---|---|
| 2019/0166134 A1* | 5/2019 | Tzeng | H04L 63/1425 |
| 2019/0190891 A1* | 6/2019 | Pillai | H04L 63/0428 |
| 2020/0099668 A1* | 3/2020 | Gudur | H04L 63/20 |
| 2022/0046114 A1* | 2/2022 | Entelis | H04L 69/08 |

OTHER PUBLICATIONS

Kent, "2.7. Traffic Flow Confidentiality (TFC) Padding", RFC 4303 IP Encapsulating Security Payload (ESP), Dec. 2005, 1 page.
Rescorla, "5.4. Record Padding", RFC 8446—The Transport Layer Security (TLS) Protocol Version 1.3, Aug. 2018, 1 page.
IEEE, "IEEE Standard for Local and metropolitan area networks—Media Access Control (MAC) Security", IEEE Std 802.1AE™-2018, 239 pages.
Dworkin, "Recommendation for Block Cipher Modes of Operation: Galois/Counter Mode (GCM) and GMAC", Nov. 2007, 39 pages.
Beaulieu, "Simon and Speck: Block Ciphers for the Internet of Things*", Jul. 9, 2015, 15 pages.

\* cited by examiner

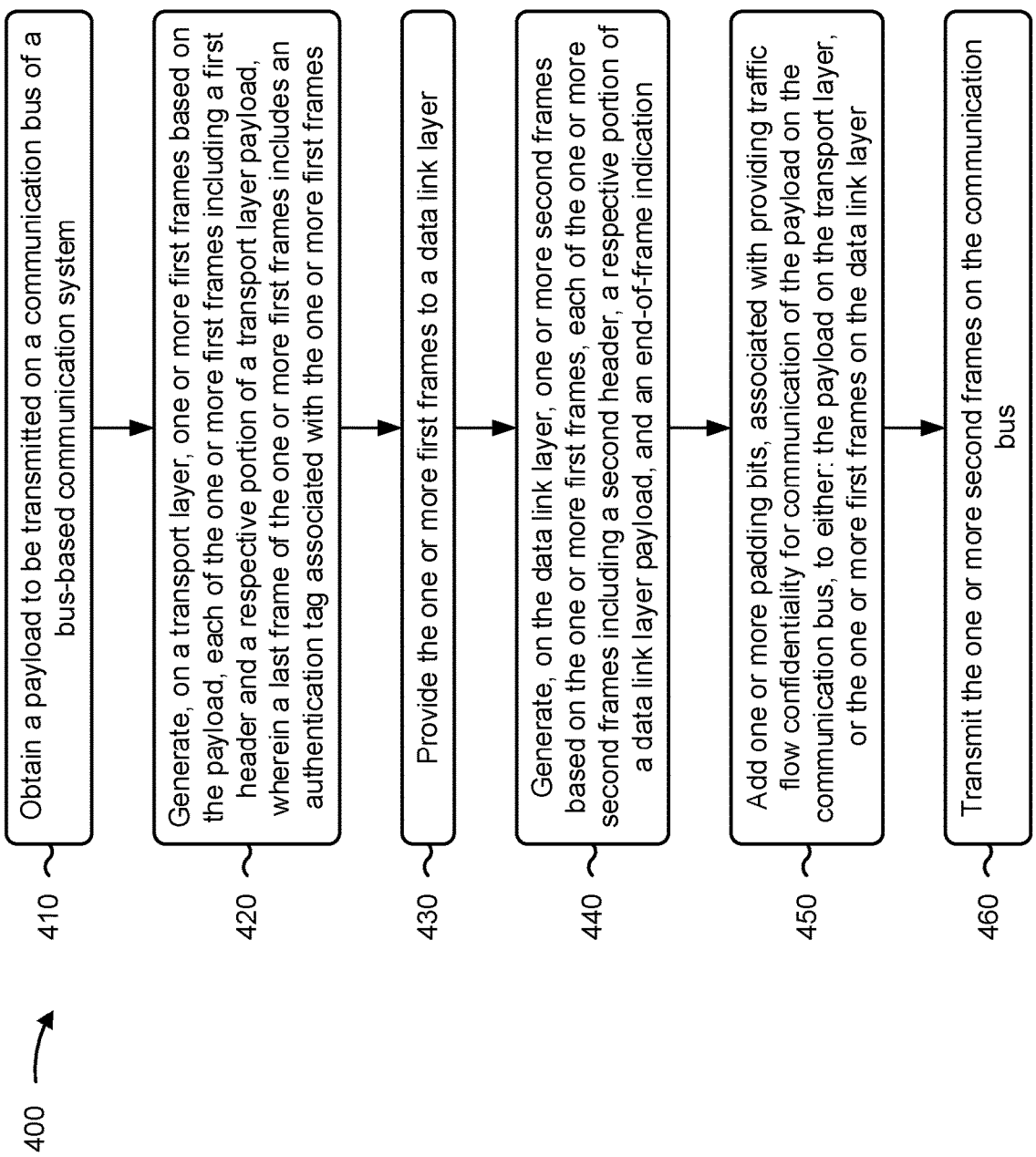

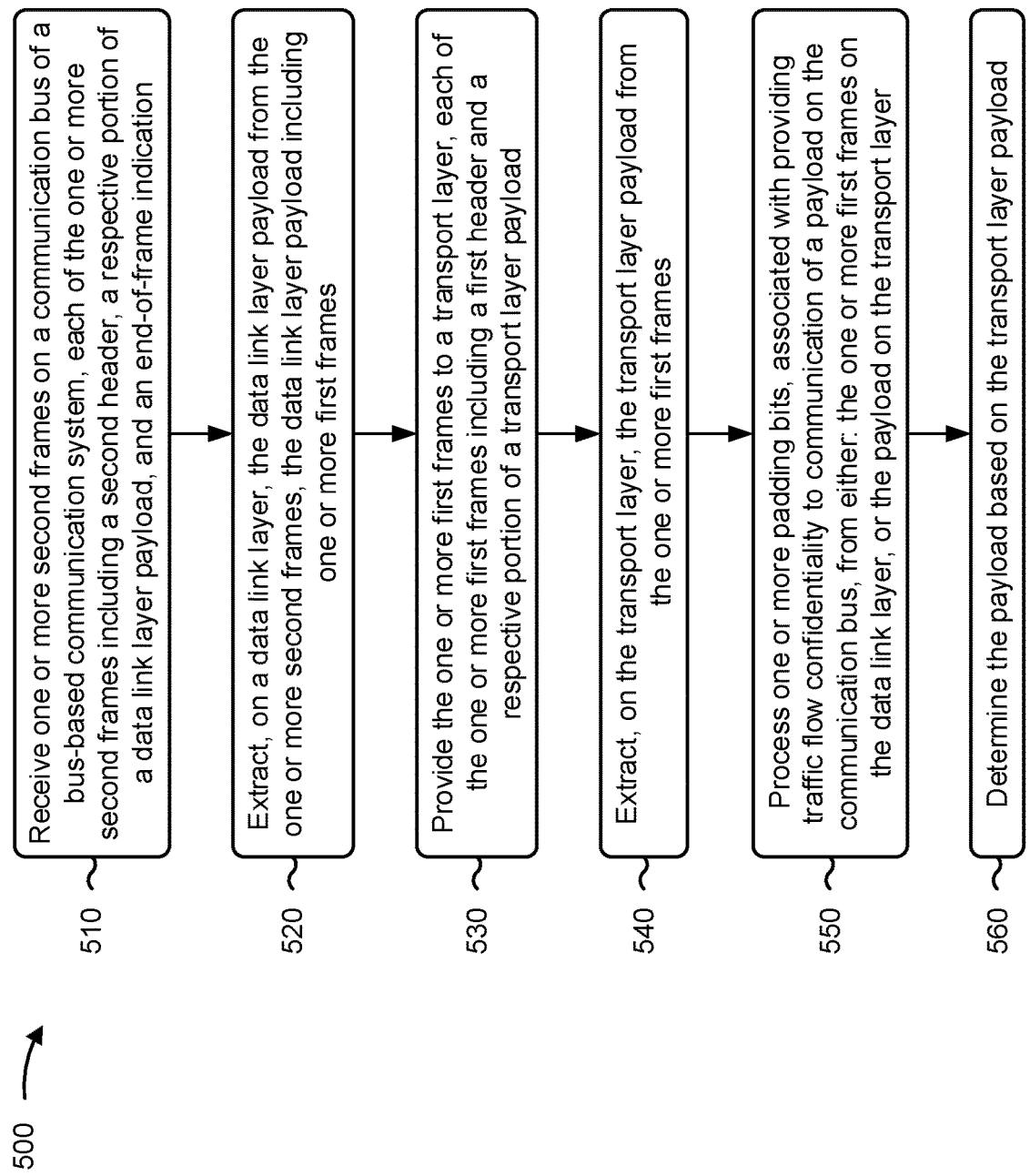

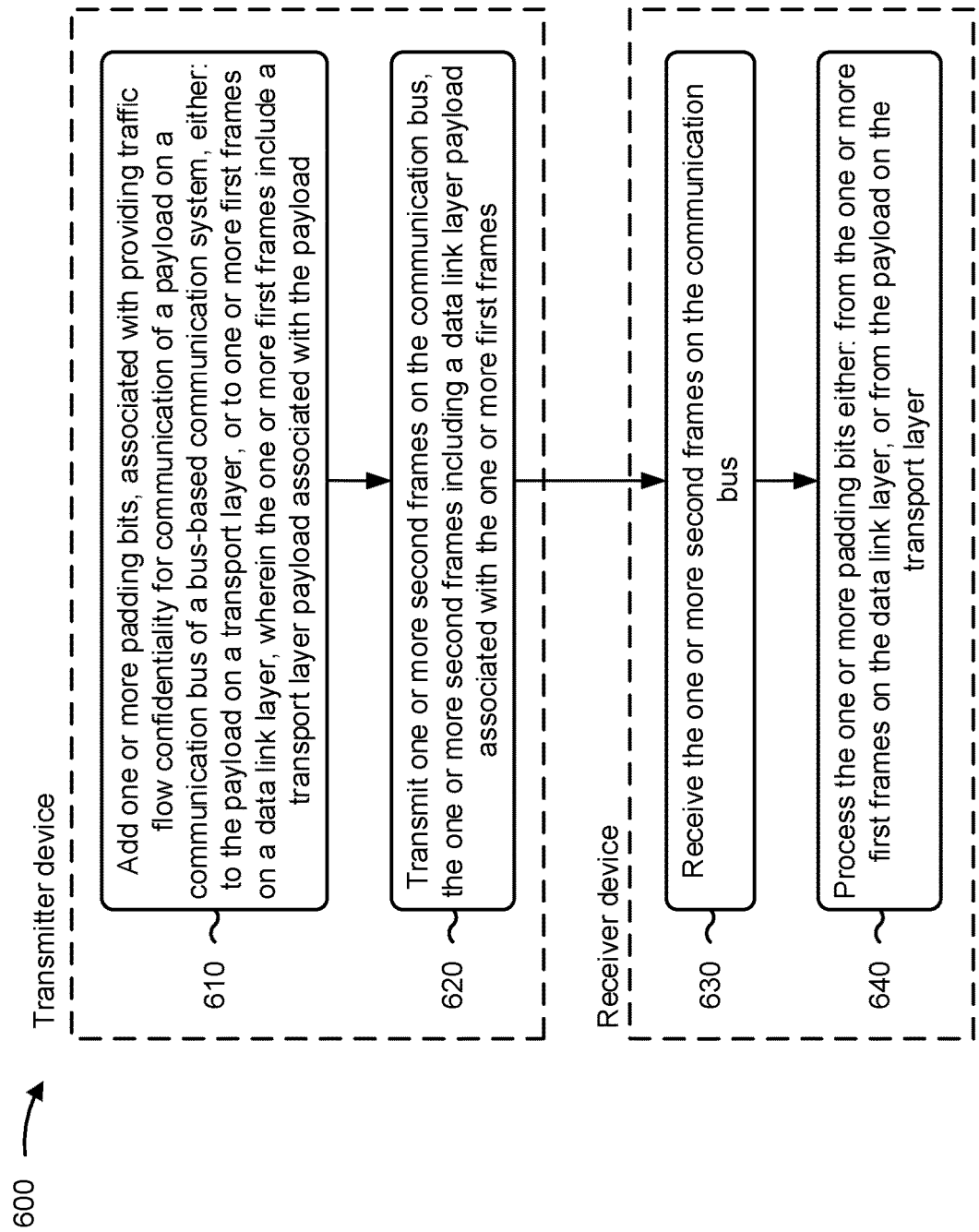

CONTROLLER AREA NETWORK TRAFFIC FLOW CONFIDENTIALITY

BACKGROUND

A bus-based communication system, such as a controller area network (CAN), is a network of one or more communication buses that interconnect nodes of a particular system. An individual node can include, for example, a sensor, an actuator, a controller, and/or another device that is used by the system to perform a function. In a vehicle system, a node can correspond to a sensor, an actuator, and/or an Electronic Control Unit (ECU) (e.g., an Engine Control Module (ECM), a Powertrain Control Module (PCM), a Transmission Control Module (TCM), a Brake Control Module (BCM), a Central Control Module (CCM), a Central Timing Module (CTM), a General Electronic Module (GEM), a Body Control Module (BCM), a Suspension Control Module (SCM), and/or the like) that is associated with a function of a vehicle. Nodes within a bus-based communication system communicate with one another via the communication bus using string of bits, or frames, that are serially transmitted and/or received according to a message-based communication protocol. A CAN system is often used in vehicles (e.g., road vehicles, off-road vehicles, marine vehicles, aerial vehicles, and/or the like), and can also be used for other applications (e.g., industrial systems, medical systems, robotics systems, and/or the like).

SUMMARY

According to some possible implementations, a transmitter device included in a bus-based communication system may include a transmitter; and one or more processors configured to: obtain a payload to be transmitted on a communication bus of the bus-based communication system; generate, on a transport layer, one or more first frames based on the payload, each of the one or more first frames including a first header and a respective portion of a transport layer payload, wherein a last frame of the one or more first frames includes an authentication tag associated with the one or more first frames; provide the one or more first frames to a data link layer; generate, on the data link layer, one or more second frames based on the one or more first frames, each of the one or more second frames including a second header, a respective portion of a data link layer payload, and an end-of-frame indication; add one or more padding bits, associated with providing traffic flow confidentiality for communication of the payload on the communication bus, to either: the payload on the transport layer, or the one or more first frames on the data link layer; and transmit the one or more second frames on the communication bus.

According to some possible implementations, a receiver device included in a bus-based communication system may include a receiver; and one or more processors configured to: receive one or more second frames on a communication bus of the bus-based communication system, each of the one or more second frames including a second header, a respective portion of a data link layer payload, and an end-of-frame indication; extract, on a data link layer, the data link layer payload from the one or more second frames, the data link layer payload including one or more first frames; provide the one or more first frames to a transport layer, each of the one or more first frames including a first header and a respective portion of a transport layer payload; extract, on the transport layer, the transport layer payload from the one or more first frames; process one or more padding bits, associated with providing traffic flow confidentiality to communication of a payload on the communication bus, from either: the one or more first frames on the data link layer, or the payload on the transport layer; and determine the payload based on the transport layer payload.

According to some implementations, a method may include adding, by a transmitter device of a bus-based communication system, one or more padding bits, associated with providing traffic flow confidentiality for communication of a payload on a communication bus of the bus-based communication system, either: to the payload on a transport layer, or to one or more first frames on a data link layer, wherein the one or more first frames include a transport layer payload associated with the payload; transmitting, by the transmitter device, one or more second frames on the communication bus, the one or more second frames including a data link layer payload associated with the one or more first frames; receiving, by a receiver device of the bus-based communication system, the one or more second frames on the communication bus; and processing, by the receiver device, the one or more padding bits either: from the one or more first frames on the data link layer, or from the payload on the transport layer.

BRIEF DESCRIPTION OF THE DRAWINGS

FIGS. 4-6 are flow charts of various example processes associated with providing CAN traffic flow confidentiality, in accordance with various aspects of the present disclosure.

DETAILED DESCRIPTION

The following detailed description of example implementations refers to the accompanying drawings. The same reference numbers in different drawings may identify the same or similar elements.

As described above, a bus-based communication system, such as a CAN, may include a network of one or more communication buses that interconnect nodes of a system (e.g., a vehicle system, an industrial system, a medical system, a robotics system, and/or the like). A node may include a sensor, an actuator, a controller, and/or another device that is used to perform a function of the associated system. In a vehicle, for instance, a node may correspond to a sensor, an actuator, and/or an ECU that is associated with a throttle function, a steering function, a braking function, a gear selection function, and/or another function of the vehicle.

In general, a node of a bus-based communication system may communicate with other nodes on a communication bus via frames (e.g., strings of bits) that are serially transmitted and/or received according to a message-based communication protocol. For example, a node may transmit a frame of dominant and/or recessive bits that can be interpreted by another node as information provided via a sensor, information for controlling an actuator, an operating parameter, an operating condition, and/or the like.

Figure 1A:
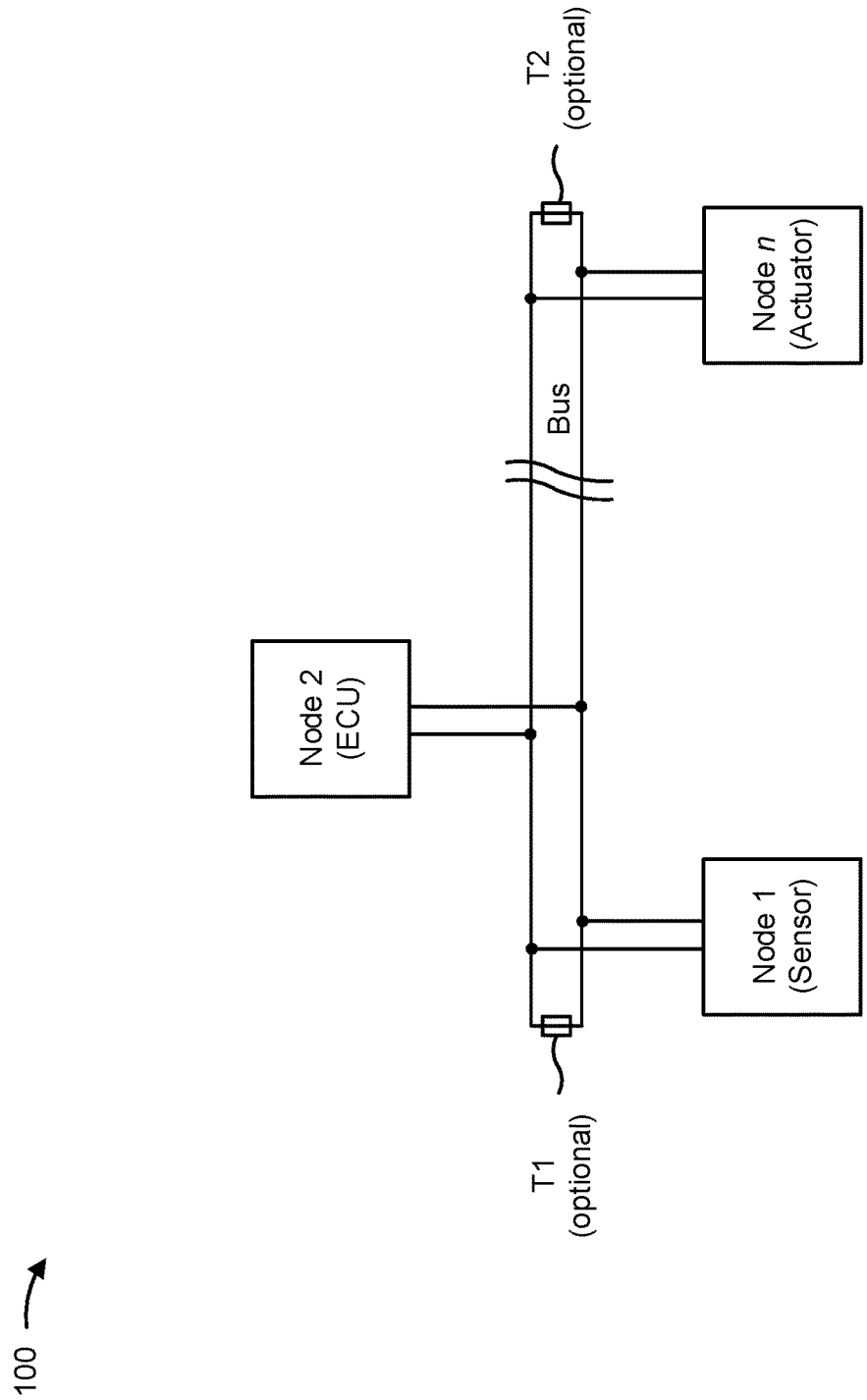
FIGS. 1A and 1B are diagrams illustrating examples associated with a bus-based communication system, in accordance with various aspects of the present disclosure.
Figure 1B:
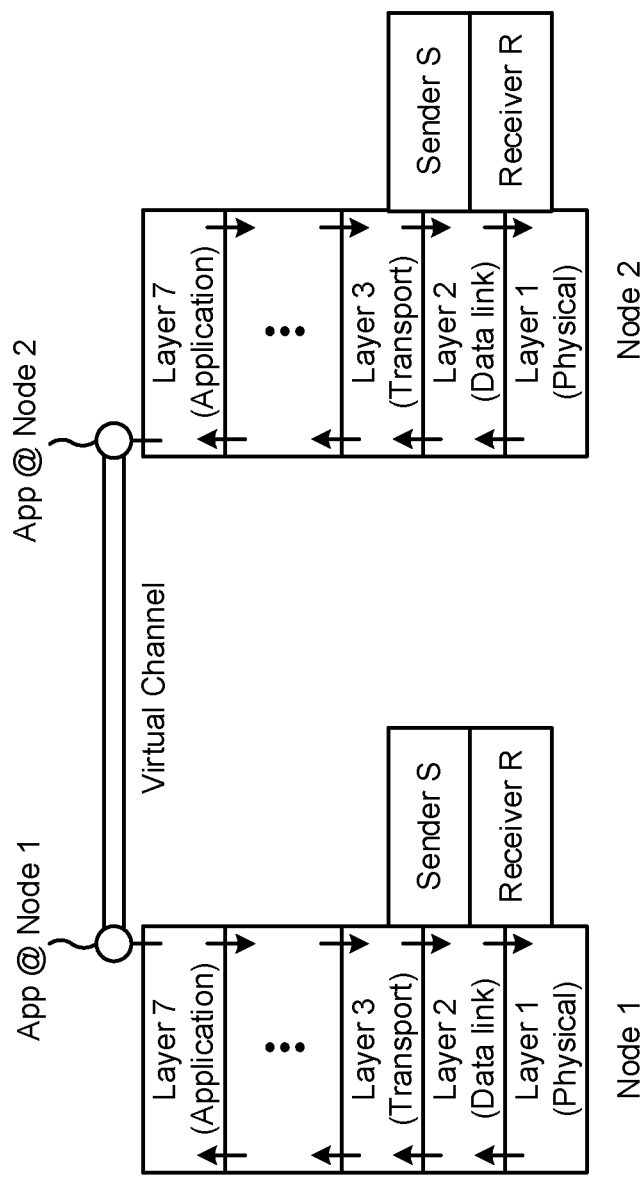

FIGS. 1A and 1B are diagrams illustrating examples associated with a bus-based communication system, in accordance with various aspects of the present disclosure. FIG. 1A illustrates an example of a bus-based communication system 100 connecting a group of nodes Node 1 through Node n (n>1). In the example of FIG. 1A, the communication bus is shown as a two line bus system, which may be implemented as two differential lines. Notably, other implementations of a communication bus are possible. In the bus-based communication system, a node may selectively apply a direct current (DC) voltage signal across the bus terminals to transmit a dominant bit or a recessive bit. For example, a node may transmit a dominant bit (e.g., a logical "0" bit) by driving the high bus terminal to a high voltage (e.g., 5 VDC) and by driving the low bus terminal to a low voltage (e.g., 0 VDC), and may transmit a recessive bit (e.g., a logical "1" bit) by driving neither bus terminal. The bus terminals may extend between the nodes and enable information (e.g., information provided via a sensor, information for controlling an actuator, an operating parameter, an operating condition, and/or the like) to be exchanged between the nodes. As further shown in FIG. 1A, the bus-based communication system may be terminated with (optional) termination resistors T1 and T2, which may serve to reduce reflections on the communication bus that could otherwise affect signal quality along the communication bus. In some cases, the nodes of a communication bus may communicate with one another according to a message-based communication protocol. For example, a first node may transmit a message as a frame of bits that are serially introduced into the communication bus and serially received by a second node. A frame may generally include one or more designated fields that provide different types of information relating to the message contained in the frame. Additional details regarding frames for communication on the bus are described elsewhere herein.

Examples of bus-based communication systems in a vehicle include CAN, CAN with flexible data rate (CAN FD), CAN extra large (CAN XL), and local interconnect network (LIN). While implementations described herein are described in the context of CAN variants, such as CAN XL, the techniques described herein may be applied to other types of bus-based communication systems.

An in-vehicle bus-based communication system, such as that shown in FIG. 1A, may have particular attributes reflecting requirements for in-vehicle networks. As an example, the in-vehicle bus-based communication system network may support communication of sensor data to a control unit by data frames being transmitted from the sensor or a control unit of the sensor to a control unit on a higher level. A particular protocol may be used for the data frames or protocol frames communicated between individual nodes or participants of the bus-based communication system. In return or in response to receipt of sensor data, the control unit of the sensor or the control unit on the higher level may communicate information associated with an action to an actuator coupled to the bus. As a particular example, with reference to FIG. 1A, Node 1 may represent an angle sensor measuring an angle of a brake pedal. Node 1 may transmit information indicating the measured angle in one or more protocol frames to Node 2, which may be an ECU. In response to receiving the information associated with the angle, Node 2 may transmit one or more bus frames to Node n, which may be a brake actuator. These frames transmitted, when received by Node n, may cause a braking action. Bus-based communications related to such an action are time critical and, therefore, should be transmitted, received, and processed quickly (e.g., in real-time or near real-time). Such timing requirements are not common in a typical communication network.

Further, in-vehicle communication networks typically have a well-defined number of nodes that, generally, remain constant over a lifetime of a vehicle. Likewise, existing links between individual nodes are not likely to be altered over the lifetime of the vehicle and, therefore, a topology of the bus-based communication system is likely to remain constant. In a standard computer network, such a situation is unlikely.

In bus-based communication system 100, authenticity of a protocol frame transmitted over the communication bus of bus-based communication system 100 may be desirable, particularly in association with controlling a function of a vehicle. Taking a braking action as an example, a command causing an emergency braking should not be mistaken for a gentle braking when parking the vehicle in a controlled manner. To this end, an indication of authenticity of a frame communicated between participants of the bus-based communication system is advantageous. In some cases, authenticity of a frame can be provided at a data link layer (layer 2) of a given node. In general, indicating authenticity of a protocol frame on a data link layer eliminates involvement of higher layers in authentication of (time-critical) commands communicated between participants of the bus-based communication system.

Further, with increasingly capable entertainment systems and increasing vehicle-to-vehicle communications, there is an increasing susceptibility to malicious commands or protocol frames being injected to a bus-based communication system. Therefore, bus-based communication system 100 may provide data security for frames (e.g., to prevent injection of the malicious frames). In some cases, data security can be provided at the data link layer or at a transport layer (layer 3). In some cases, data security may be provided on one or more other layers (e.g., one or more upper or lower layers) other than the transport layer and the data link layer.

The number and arrangement of devices shown in FIG. 1A are provided as examples. In practice, there may be additional devices, fewer devices, different devices, or differently arranged devices than those shown in FIG. 1A. Furthermore, two or more devices shown in FIG. 1A may be implemented within a single device, or a single device shown in FIG. 1A may be implemented as multiple, distributed devices. Additionally, or alternatively, a set of devices (e.g., one or more devices) of FIG. 1A may perform one or more functions described as being performed by another set of devices of FIG. 1A. For example, while bus-based communication system 100 is shown with two bus terminals, the communication bus may interconnect the nodes using a different number of bus terminals and/or using a different arrangement of bus terminals that interconnect a different arrangement of nodes. As another example, the communication bus may be arranged in another topology, such as a ring topology (e.g., in which ends of the communication bus are electrically coupled to a single master unit). As another example, the communication bus may comprise a plurality of communication buses and/or be in selective communication with one or more additional communication buses.

FIG. 1B illustrates an example of a communication stack and virtual channels between Node 1 and Node 2. As shown in FIG. 1B, communication between Node 1 and Node 2 flows in layers that can be categorized according to, for example, the OSI-ISO layer model. The lowest level layer (layer 1) is referred to as the physical layer. Each layer in the model can accept an order from a higher layer, perform some action at its level, and trigger a task in a lower layer by forwarding a request to the lower layer. For example, a command to the data link layer (layer 2) may be received from the transport layer (layer 3), as indicated by the downward arrow between the transport layer and the data link layer. Similarly, a command to the physical layer (layer 1) may be received from the data link layer, as indicated by the downward arrow between the physical layer and the data link layer. The physical layer of Node 1 may use a connection or link to Node 2 in order to communicate data on the physical layer to Node 2. Similarly, Node 1 may receive data from Node 2 over the physical link between Node 1 and Node 2. Here, the physical layer of Node 1 may forward the received data to the data link layer and, after processing at the data link layer, the data link layer may forward data to the transport layer. This forwarding is indicated by the upward arrow between the physical layer and the data link layer of Node 1 and the upward arrow between the data link layer and the transport layer of Node 1. The protocol flow in Node 2 is similar to that of Node 1. Notably, some existing in-vehicle bus-based communication networks do not follow the separation of physical layer and the data link layer as suggested in the OSI/ISO model. To reflect this, a specialty sender S and receiver R are depicted in FIG. 1B as extending over the physical layer and the data link layer.

In some cases, techniques for providing authenticity of data communication in vehicles are implemented in the application layer (layer 7) using a software stack, indicated as App@Node 1 and App@Node 2 in FIG. 1B. Further, it may be useful to introduce a concept of virtual channels between Node 1 and Node 2 to indicate an authenticated and/or protected communication between two or more participants using the software stacks App@Node1 and App@Node2. One example associated with providing security for onboard networks, in a vehicle using software stacks, is secure onboard communication (SEC-OC) according to the automotive open system architecture (AUTOSAR) standard.

In general, it may be convenient for original equipment manufacturers to specify the software stacks application for Node 1 and Node 2 (e.g., App@Node1, App@Node2), which gives freedom in hardware implementation of Node 1 and Node 2. As a trade-off, implementing authenticity and/or data security using a software stack may not meet a timing requirement, for example, for a first node (e.g., an actuator) in a bus-based communication system to respond to a command from a second node (e.g., an ECU) in the bus-based communication system. Consider, for example, a braking command sent as a protocol frame from the second node to the first node. Here, if such a communication were to be authenticated and secured using the software stack, all layers for each node would be involved, which may take too long for a reliable braking operation. A further disadvantage of a software stack authenticity and/or data security solution may be the fact that the software stacks may not be properly designed, so that the authenticity and/or security functionality is degraded or even compromised. Therefore, it may in some cases be desirable to limit functionality pertaining to authenticity and/or data security to one or two lower layers of an individual participant to the bus-based communication system. Limiting the authenticity and/or data security functionality to, for example, the data link layer and/or the transport layer may eliminate a need for higher protocol layers to be involved in data integrity and/or data security operations, thereby reducing an amount of time needed to receive, transmit, or process a given communication over the bus-based communication system.

The number and arrangement of layers shown in FIG. 1B are provided as one or more examples. In practice, there may be additional layers, fewer layers, different layers, or differently arranged layers than those shown in FIG. 1B. Furthermore, two or more layers shown in FIG. 1B may be implemented within a single layer, or a single layer shown in FIG. 1B may be implemented as multiple, distributed layers. Additionally, or alternatively, a set of layers (e.g., one or more layers) of FIG. 1B may perform one or more functions described as being performed by another set of layers of FIG. 1B.

In some cases, in addition to data security and/or authenticity, it is desirable to provide traffic flow confidentiality to communications on a communication bus of a bus-based communication system 100. Providing traffic flow confidentiality means providing a mechanism by which an amount of data (e.g., a size or length of a payload, a number of bits of data, and/or the like) carried in a given communication on a bus of a bus-based communication system is hidden, such that an observer (e.g., a malicious actor, or a recipient of the communication that is not an intended recipient) cannot derive the amount of data carried in the given communication.

Traffic flow confidentiality may be useful when, for example, the fact that more or less data is being communicated in a given communication transmitted by a given node can impart at least some knowledge about content of the given communication to an observer. This may the case when, for example, an amount of data in a communication depends on a type of data being communicated. Generally, traffic flow confidentiality can be provided by adding one or more padding bits to a communication, and then encrypting a result of adding the one or more padding bits to the communication. Thus, including padding bits in a communication may serve to hide a true amount of data in the communication, thereby providing traffic flow confidentiality.

Some implementations described herein provide traffic flow confidentiality for a bus-based communication system. In some implementations, the implementations described herein may be implemented in, for example, a system that utilizes a CAN protocol, a CAN FD protocol, or a CAN XL protocol. In some implementations, a transmitter device of the bus-based communication system may add one or more padding bits, associated with providing traffic flow confidentiality for communication of a payload on a communication bus of the bus-based communication system, either to the payload on a transport layer, or to one or more first frames on a data link layer. Here, the one or more first frames may include a transport layer payload associated with the payload. The transmitter device may then transmit one or more second frames on the communication bus. Here, the one or more second frames may include a data link layer payload associated with the one or more first frames. In some implementations, a receiver device of the bus-based communication system may receive the one or more second frames on the communication bus, and may process the one or more padding bits either from the one or more first frames on the data link layer or from the payload on the transport layer.

In this way, one or more padding bits may be included in a communication to cause a true amount of data in the communication to be hidden during communication on a communication bus, thereby providing traffic flow confidentiality for the bus-based communication system. Additional details are described below.

Figure 2A:
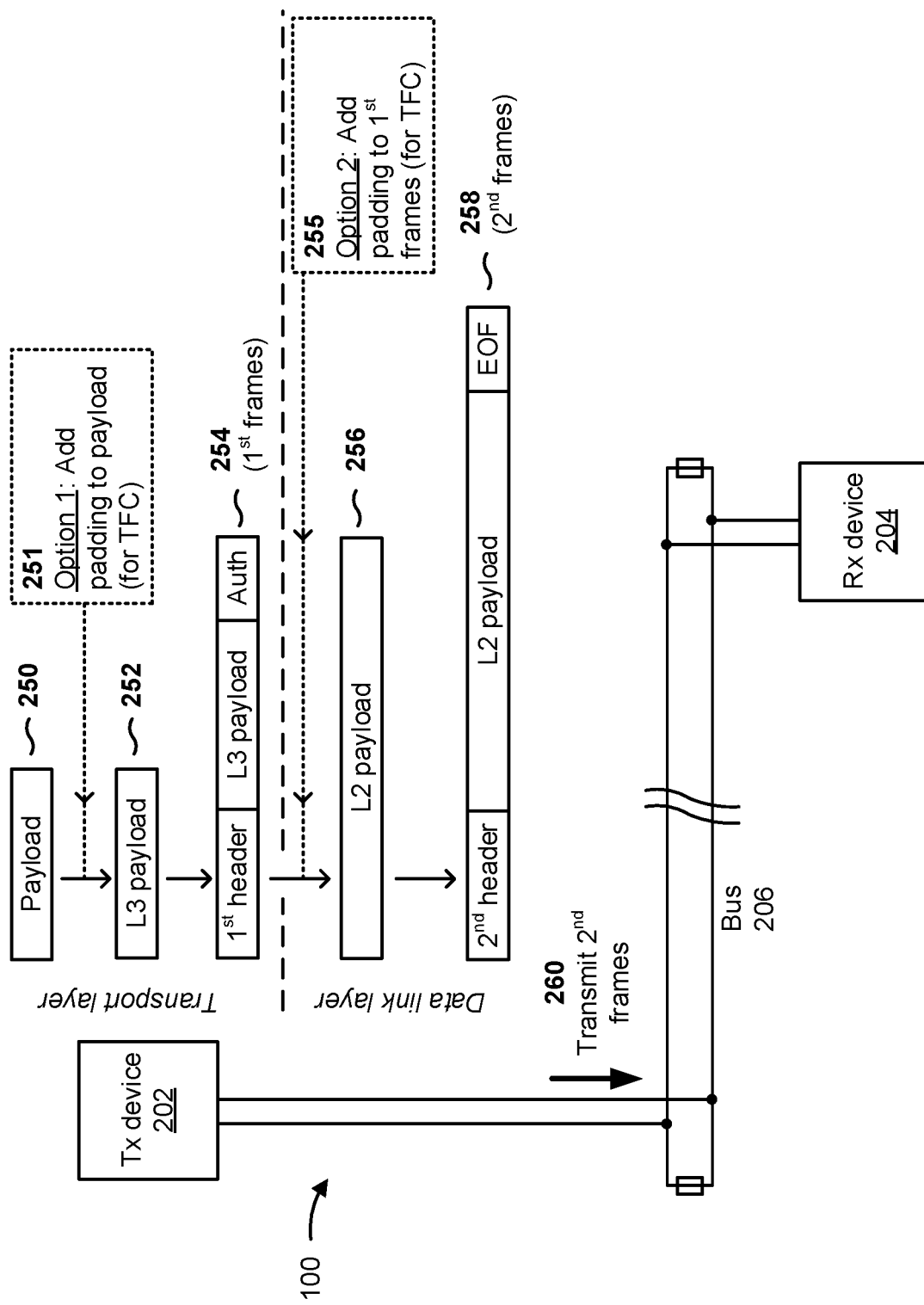
FIGS. 2A and 2B are diagrams of an example of providing traffic flow confidentiality in a bus-based communication system, in accordance with various aspects of the present disclosure.
Figure 2B:
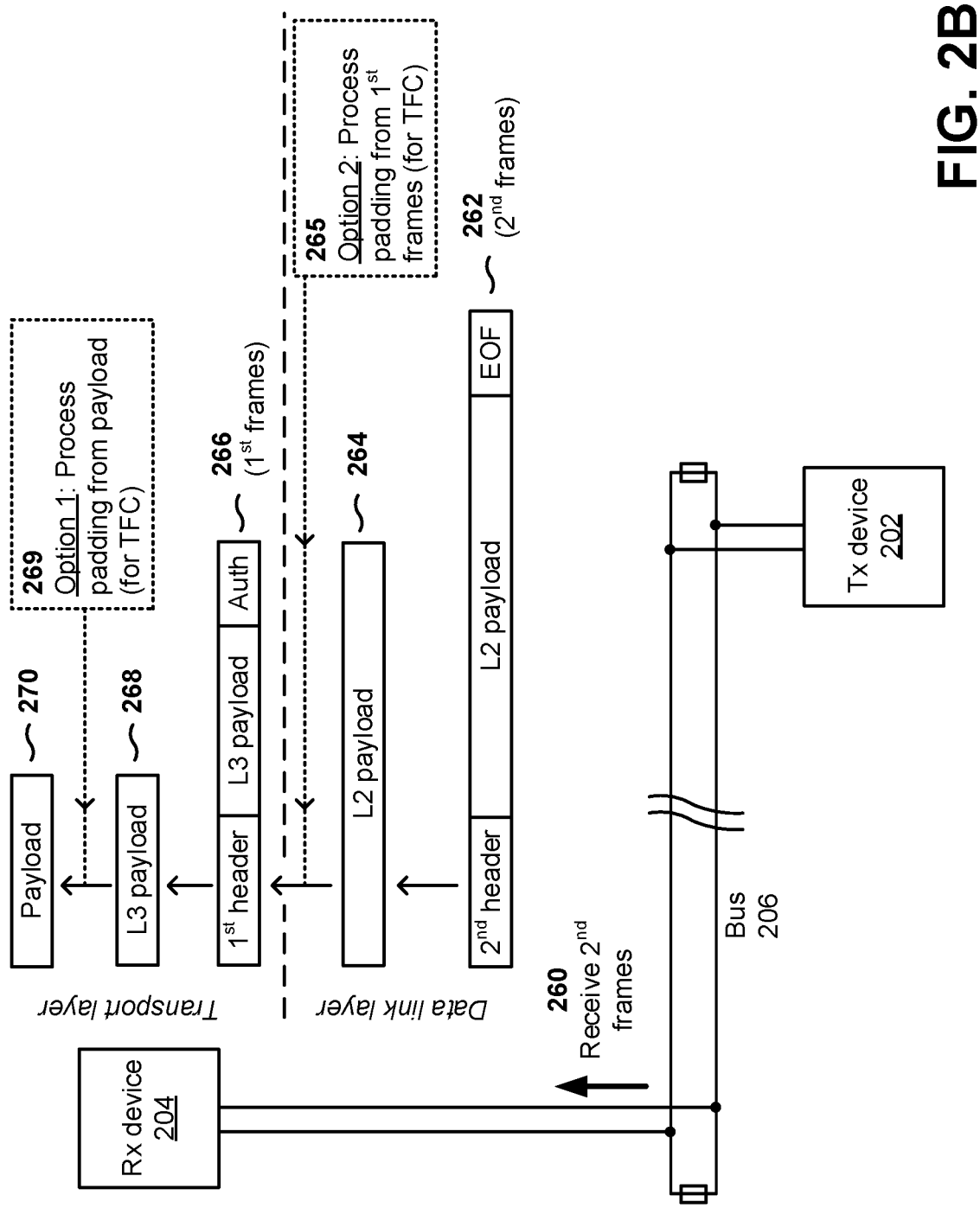

FIGS. 2A and 2B are diagrams of an example of providing traffic flow confidentiality in a bus-based communication system, in accordance with various aspects of the present disclosure. In the example shown in FIGS. 2A and 2B, a bus-based communication system 100 includes a first node, identified as transmitter (Tx) device 202, and a second node, identified as receiver (Rx) device 204. As shown, transmitter device 202 and receiver device 204 are connected via a communication bus 206 of bus-based communication system 100. Bus-based communication system 100 of FIGS. 2A and 2B may use, for example, CAN XL protocol, CAN FD protocol, CAN protocol, and/or the like. In the example shown in FIGS. 2A and 2B, transmitter device 202 is to transmit a communication to receiver device 204 on communication bus 206, while providing traffic flow confidentiality.

As shown in FIG. 2A by reference 250, transmitter device 202 may obtain a payload to be transmitted on communication bus 206 of bus-based communication system 100. When bus-based communication system 100 is an in-vehicle bus-based communication system, the payload may comprise a sequence of bits that represent, for example, sensor information provided via a sensor, information for controlling an actuator, an operating parameter, an operating condition, and/or another type of information associated with controlling a function of a vehicle.

As shown by reference 251, transmitter device 202 may, in some implementations, add one or more padding bits to the payload on a transport layer (sometimes referred to as a TPsec layer or layer 3). The one or more padding bits include a set of bits (e.g., one or more 0 bits) associated with providing traffic flow confidentiality for communication of the payload on communication bus 206 of bus-based communication system 100. As indicated in FIG. 2A, adding the one or more padding bits to the payload on the transport layer is a first option for providing traffic flow confidentiality.

In some implementations, when the one or more padding bits are added to the payload on the transport layer, transmitter device 202 may add the one or more padding bits such that a total length of the padded payload matches an indicated total padded payload length. For example, transmitter device 202 may receive, on the transport layer, information indicating a total length that the padded payload should have after addition of one or more padding bits. Here, transmitter device 202 may add the one or more padding bits to the payload such that a total length after padding matches the indicated total padded payload length.

In some implementations, when the one or more padding bits are added to the payload on the transport layer, transmitter device 202 may also add a payload length indicator to the payload. In some implementations, the payload length indicator includes information indicating a true length of the payload (i.e., a length of the payload before the one or more padding bits were added to the payload).

As shown by reference 252, transmitter device 202 may generate, on the transport layer, a transport layer payload (identified in FIG. 2A as L3 payload). In some implementations, when the one or more padding bits (and the payload length indicator) are added to the payload on the transport layer, transmitter device 202 may encrypt (e.g., using Advanced Encryption Standard in Galois Counter Mode (AES-GCM)) a result of adding the one or more padding bits and the payload length indicator, a result of the encryption being the transport layer payload. Thus, in an implementation in which traffic flow confidentiality is provided at the transport layer, data security and authentication may also be provided at the transport layer.

As indicated above, the addition of the one or more padding bits to the payload on the transport layer is a first option for providing traffic flow confidentiality. A second option for providing traffic flow confidentiality (on a data link layer, sometimes referred to as a CADsec layer or layer 2) is described below. In a case in which traffic flow confidentiality is provided at the data link layer, the transport layer payload may be the payload as obtained by transmitter device 202 at reference 250. That is, when traffic flow confidentiality is provided at the data link layer, transmitter device 202 may not perform encryption at the transport layer and/or may not add additional information to the payload at the transport layer.

As shown by reference 254, transmitter device 202 may generate, on the transport layer, one or more first frames based on the payload. In some implementations, each of the one or more first frames may include a first header and a respective portion of the transport layer payload. Further, a last frame of the one or more first frames may include an authentication tag associated with the one or more first frames. In the example shown in FIG. 2A, the one or more first frames include a single frame, meaning that the single frame includes the first header, the entire transport layer payload, and the authentication tag.

In some implementations, when the one or more padding bits are added to the payload on the transport layer, the first header may include an indication that the transport layer payload starts with a payload length indicator. This indication may serve to inform receiver device 204 that the transport layer payload starts with the payload length indicator described above.

In some implementations, the authentication tag may represent an authentication indication that the first frame was intended to be transmitted from transmitter device 202 to receiver device 204. The authentication tag, in some implementations, further allows a determination of whether the first frame was altered between transmission by transmitter device 202 and reception by receiver device 204.

In some implementations, the first frame may include further information, such as a tag indicating sequence number (e.g., a nonce), a secure channel identifier, encryption information (e.g., information indicating a cipher suite or mode used for encryption), and/or the like.

As further indicated in FIG. 2A, the one or more first frames may be provided to the data link layer. As shown by reference 255, transmitter device 202 may, in some implementations, add one or more padding bits to the one or more first frames on the data link layer. As indicated in FIG. 2A, adding the one or more padding bits to the one or more first frames on the data link layer is a second option for providing traffic flow confidentiality.

In some implementations, when the one or more padding bits are added to the one or more first frames on the data link layer, transmitter device 202 may encrypt a result of adding the one or more padding bits to the one or more first frames to generate the data link layer payload. Thus, in an implementation in which traffic flow confidentiality is provided at the data link layer, data security may also be provided at the data link layer.

In some implementations, when the one or more padding bits are added to the one or more first frames on the data link layer, transmitter device 202 may add the one or more padding bits such that a total length to be transmitted on communication bus 206 matches an indicated total length to be transmitted on communication bus 206. For example, transmitter device 202 may receive, on the data link layer (and from the transport layer), information indicating a total length to be transmitted on communication bus 206. Here, transmitter device 202 may add the one or more padding bits to the one or more first frames based on the information indicating the total length to be transmitted on communication bus 206. Transmitter device 202 may add the one or more padding bits to the one or more first frames such that a total length to be transmitted matches the indicated total length.

In some implementations, when the one or more padding bits are added to the one or more first frames on the data link layer, the first header may include information that identifies a length of the transport layer payload. Including such information in the first header allows the data link layer at receiver device 204, after decrypting and analyzing the first header, to have information indicating the length of the transport layer payload and, therefore, strip out the padding bits.

As indicated by reference 256, transmitter device 202 may determine, on the data link layer, a data link layer payload (identified in FIG. 2A as L2). When the one or more padding bits are added to the payload on the transport layer, the data link layer payload may be the one or more first frames. Conversely, when the one or more padding bits are added to the one or more first frames on the data link layer, the data link layer payload is a result of adding the one or more padding bits to the one or more first frames. Thus, as shown by reference 258, transmitter device 202 may generate, on the data link layer, one or more second frames based on the one or more first frames. In some implementations, each of the one or more second frames may include a second header, a respective portion of the data link layer payload, and an end-of-frame (EOF) indication. In the example shown in FIG. 2A, the one or more second frames include a single frame, meaning that the single frame includes the second header, the entire data link layer payload, and the EOF indication.

In some implementations, when the one or more padding bits are added to the one or more first frames on the data link layer, the second header may include an encrypted payload length indicator. The encrypted payload length indicator may include information indicating a length of the encrypted data link layer payload. In some implementations, when the one or more padding bits are added to the one or more first frames on the data link layer, a separator may be used to separate the one or more padding bits from the one or more first frames.

As shown in FIG. 2A by reference 258, transmitter device 202 may transmit the one or more second frames on communication bus 206. For example, the one or more second frames may be provided to a physical layer (sometimes referred to as a layer 1) of transmitter device 202, and the one or more second frames may be transmitted by the physical layer on communication bus 206.

As shown in FIG. 2B by reference 260, receiver device 204 may receive the one or more second frames on communication bus 206. For example, the one or more second frames may be received by a physical layer of receiver device 204. As shown by reference 262, the one or more second frames may be provided to the data link layer of receiver device 204.

As shown by reference 264, receiver device 204 may extract, on the data link layer, the data link layer payload from the one or more second frames. For example, the data link layer may extract the data link layer payload from the one or more second frames (e.g., by removing the second header and the EOF indication). As indicated above, the data link layer payload may include the one or more first frames.

As shown by reference 265, in some implementations, receiver device 204 may process the one or more padding bits from the one or more first frames on the data link layer. For example, when transmitter device 202 adds one or more padding bits to the one or more first frames on the data link layer, receiver device 204 may process the one or more padding bits from the one or more first frames on the data link layer. As described herein, processing the one or more padding bits may include stripping out the one or more padding bits, dropping the one or more padding bits, or ignoring the one or more padding bits.

In some implementations, when receiver device 204 processes the one or more padding bits from the one or more first frames on the data link layer, receiver device 204 may decrypt the data link layer payload on the data link layer to determine the one or more first frames and the one or more padding bits.

In some implementations, as indicated above, information that identifies a length of the transport layer payload is included in the first header when the one or more padding bits are processed from the one or more first frames on the data link layer. Thus, in an implementation in which receiver device 204 decrypts and analyzes the first header on the data link layer, receiver device 204 has information indicating the length of the transport layer payload and, therefore, can process the one or more padding bits.

In some implementations, as indicated above, an encrypted payload length indicator is included in the second header when the one or more padding bits are processed from the one or more first frames on the data link layer. In some implementations, the encrypted payload length indicator allows receiver device 204 to determine a length of the encrypted data link layer payload at the data link layer.

In some implementations, as indicated above, a separator may be used to separate the one or more first frames and the one or more padding bits in the data link layer payload. In such a case, when the one or more padding bits are processed from the one or more first frames on the data link layer, receiver device 204 may distinguish between the one or more first frames and the one or more padding bits based on the separator.

As shown by reference 266, the one or more first frames may be provided to the transport layer. As shown by reference 268, receiver device 204 may extract, on the transport layer, the transport layer payload from the one or more first frames (e.g., by removing the first header and the authentication tag).

As shown by reference 269, in some implementations, receiver device 204 may process the one or more padding bits from the payload on the transport layer. For example, when transmitter device 202 adds one or more padding bits to the payload on the transport layer, receiver device 204 may process the one or more padding bits from the payload on the transport layer. As described above, processing the one or more padding bits may include stripping out the one or more padding bits, dropping the one or more padding bits, or ignoring the one or more padding bits.

In some implementations, when the one or more padding bits are processed from the payload on the transport layer, receiver device 204 may decrypt the transport layer payload on the transport layer. Transmitter device 202 may then determine, on the transport layer, a payload length indicator based on a result of decrypting the transport layer payload (e.g., since a payload length indicator may be included in the transport layer payload when transmitter device 202 adds the one or more padding bits to the payload on the transport layer, as described above). Transmitter device 202 may then process the one or more padding bits based on the payload length indicator (e.g., since a true length of the payload can be determined based on the payload length indicator). As described above, in some implementations, the first header may include an indication that the transport layer payload starts with a payload length indicator.

As shown by reference 270, receiver device 204 may determine the payload based on the transport layer payload. The payload can then be provided to a next layer in a layer stack for further processing.

As indicated above, FIGS. 2A and 2B are provided merely as examples. Other examples may differ from what is described with regard to FIGS. 2A and 2B.

Figure 3:
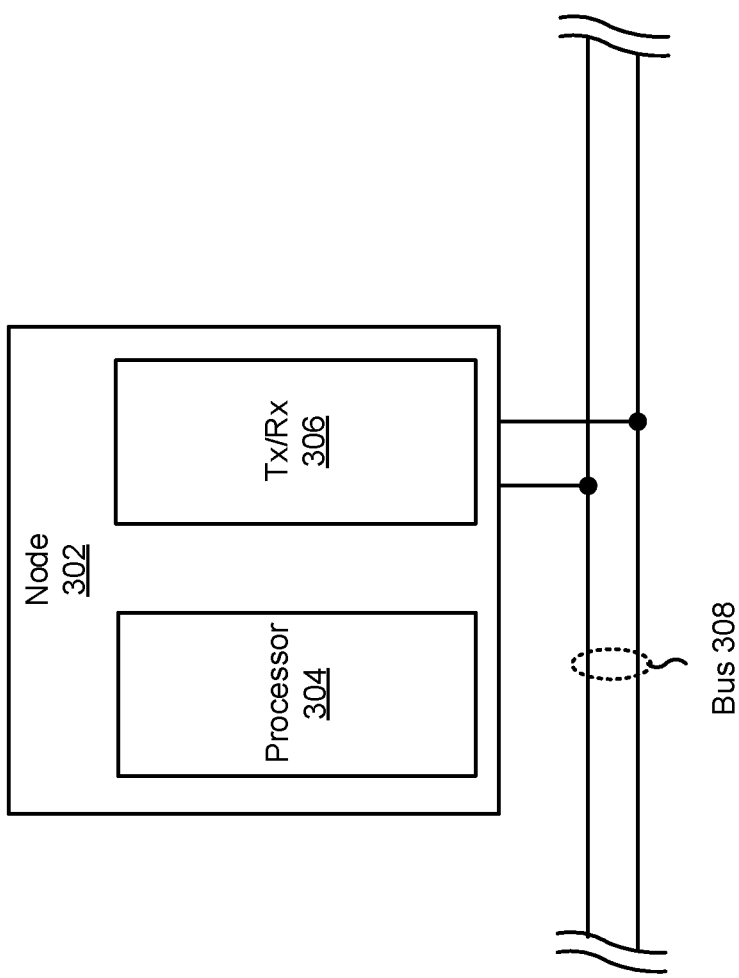
FIG. 3 is a diagram of an example of a node at which systems and/or methods described herein may be implemented.

FIG. 3 is a diagram of an example of a node 302 at which systems and/or methods described herein may be implemented. Node 302 may correspond to, for example, transmitter device 202 and/or receiver device 204 shown in FIGS. 2A and 2B. As shown in FIG. 3, node 302 may include a processor 304 and a transceiver 306 (e.g., Tx/Rx) connected to a communication bus 308 (e.g., a CAN bus).

Node 302 includes one or more devices associated with controlling one or more electrical systems and/or electrical subsystems based, for example, on sensor data provided by sensors connected to node 302 via a sensor interface component of node 302 (not shown), control data for controlling actuators connected to node 302 via an actuator interface component of node (not shown), and/or the like. In a vehicle system, for example, node 302 may include an ECU, an ECM, a PCM, a TCM, a BCM, a CCM, a CTM, a GEM, a BCM, a SCM, or another type of electrical system or electrical subsystem of a vehicle.

Processor 304 includes a device (e.g., one or more integrated circuits) that operates as an embedded system for providing the control functionality associated with node 302. For example, processor 304 includes one or more central processing units (CPUs), memories, and/or programmable input/output (I/O) peripherals that allow processor 304 to operate as an embedded system. In some examples, processor 304 may send information to and/or receive information from transceiver 306.

Transceiver 306 includes a component via which node 302 may transmit and receive information. For example, transceiver 306 may include a differential line transceiver, or a similar type of component. In some examples, transceiver 306 includes a transmit (Tx) component that allows node 302 to transmit information (e.g., to another node) via communication bus 308, and/or a receive (Rx) component that allows node 302 to receive information (e.g., from another node that is similar to node 302) via communication bus 308. In some examples, transceiver 306 may include a line driver for enabling the Tx component (to transmit information) or the Rx component (to receive information) at a given time. In some examples, transceiver 306 may be a LIN transceiver, a CAN transceiver, a FlexRay transceiver, an Ethernet transceiver, or another type of transceiver associated with another type of communication bus system. In some examples, node 302 may include multiple transceivers 306 of different types.

Communication bus 308 includes a bus for carrying information from or to node 302. In some examples, communication bus 308 may comprise a connection (e.g., including one or more terminals, wires, and/or connectors) via which multiple nodes 302 are connected to one another.

In some examples, communication bus 308 may include a set of connections, each associated with one or more nodes 302. In some examples, communication bus 308 may be a CAN bus, a CAN FD bus, a CAN XL bus, a LIN bus, a FlexRay bus, an Ethernet bus, and/or another type of bus. In some examples, each transceiver 306 of node 302 may be connected to an associated communication bus 308.

The number and arrangement of devices and components shown in FIG. 3 is provided as an example. In practice, there may be additional devices and/or components, fewer devices and/or components, different devices and/or components, or differently arranged devices and/or components than those shown in FIG. 3. Furthermore, two or more devices and/or components shown in FIG. 3 may be implemented within a single device and/or component, or a single device and/or a single component shown in FIG. 3 may be implemented as multiple, distributed devices and/or components. Additionally, or alternatively, a set of devices and/or components (e.g., one or more devices and/or components) of FIG. 3 may perform one or more functions described as being performed by another set of devices and/or components of FIG. 3.

FIG. 4 is a flow chart of an example process 400 associated with providing CAN traffic flow confidentiality. In some implementations, one or more process blocks of FIG. 4 may be performed by a transmitter device (e.g., transmitter device 202, node 302, and/or the like).

As shown in FIG. 4, process 400 may include obtaining a payload to be transmitted on a communication bus of the bus-based communication system (block 410). For example, the transmitter device (e.g., using processor 304, transceiver 306, and/or the like) may obtain a payload to be transmitted on a communication bus (e.g., bus 308) of the bus-based communication system, as described above.

As further shown in FIG. 4, process 400 may include generating, on a transport layer, one or more first frames based on the payload, each of the one or more first frames including a first header and a respective portion of a transport layer payload, wherein a last frame of the one or more first frames includes an authentication tag associated with the one or more first frames (block 420). For example, the transmitter device (e.g., processor 304, transceiver 306, and/or the like) may generate, on a transport layer, one or more first frames based on the payload, each of the one or more first frames including a first header and a respective portion of a transport layer payload, as described above. In some implementations, a last frame of the one or more first frames includes an authentication tag associated with the one or more first frames.

As further shown in FIG. 4, process 400 may include providing the one or more first frames to a data link layer (block 430). For example, the transmitter device (e.g., processor 304, transceiver 306, and/or the like) may provide the one or more first frames to a data link layer, as described above.

As further shown in FIG. 4, process 400 may include generating, on the data link layer, one or more second frames based on the one or more first frames, each of the one or more second frames including a second header, a respective portion of a data link layer payload, and an end-of-frame indication (block 440). For example, the transmitter device (e.g., processor 304, transceiver 306, and/or the like) may generate, on the data link layer, one or more second frames based on the one or more first frames, each of the one or more second frames including a second header, a respective portion of a data link layer payload, and an end-of-frame indication, as described above.

As further shown in FIG. 4, process 400 may include adding one or more padding bits, associated with providing traffic flow confidentiality for communication of the payload on the communication bus, to either the payload on the transport layer, or the one or more first frames on the data link layer (block 450). For example, the transmitter device (e.g., processor 304, transceiver 306, and/or the like) may add one or more padding bits, associated with providing traffic flow confidentiality for communication of the payload on the communication bus, to either the payload on the transport layer, or the one or more first frames on the data link layer, as described above.

As further shown in FIG. 4, process 400 may include transmitting the one or more second frames on the communication bus (block 460). For example, the transmitter device (e.g., processor 304, transceiver 306, and/or the like) may transmit the one or more second frames on the communication bus, as described above.

Process 400 may include additional implementations, such as any single implementation or any combination of implementations described below and/or in connection with one or more other processes described elsewhere herein.

In some implementations, the bus-based communication system uses a CAN protocol, a CAN FD protocol, or a CAN XL protocol.

In some implementations, the transmitter device is further configured to, when the one or more padding bits are added to the payload on the transport layer, add, on the transport layer, a payload length indicator to the payload, and encrypt, on the transport layer, a result of adding the payload length indicator and adding the one or more padding bits to the payload to generate the transport layer payload.

In some implementations, the transmitter device is further configured to, when the one or more padding bits are added to the payload on the transport layer, receive, on the transport layer, information indicating a total padded payload length, and add the one or more padding bits to the payload based on the information indicating the total padded payload length.

In some implementations, the first header includes an indication that the transport layer payload starts with a payload length indicator when the one or more padding bits are added to the payload on the transport layer.

In some implementations, the transmitter device is further configured to, when the one or more padding bits are added to the one or more first frames on the data link layer, encrypt, on the data link layer, a result of adding the one or more padding bits to the one or more first frames to generate the data link layer payload.

In some implementations, the transmitter device is further configured to, when the one or more padding bits are added to the one or more first frames on the data link layer, receive, on the data link layer, information indicating a total length to be transmitted on the communication bus, the information indicating the total length being received from the transport layer, and add the one or more padding bits to the one or more first frames based on the information indicating the total length to be transmitted on the communication bus.

In some implementations, information that identifies a length of the transport layer payload is included in the first header when the one or more padding bits are added to the one or more first frames on the data link layer.

In some implementations, an encrypted payload length indicator is included in the second header when the one or more padding bits are added to the one or more first frames on the data link layer.

In some implementations, a separator is used to separate the one or more padding bits from the one or more first frames when the one or more padding bits are added to the one or more first frames on the data link layer.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 associated with providing CAN traffic flow confidentiality. In some implementations, one or more process blocks of FIG. 5 may be performed by a receiver device (e.g., receiver device 204, node 302, and/or the like).

As shown in FIG. 5, process 500 may include receiving one or more second frames on a communication bus of a bus-based communication system, each of the one or more second frames including a second header, a respective portion of a data link layer payload, and an end-of-frame indication (block 510). For example, the receiver device (e.g., using processor 304, transceiver 306, and/or the like) may receive one or more second frames on a communication bus of the bus-based communication system, each of the one or more second frames including a second header, a respective portion of a data link layer payload, and an end-of-frame indication, as described above.

As further shown in FIG. 5, process 500 may include extracting, on a data link layer, the data link layer payload from the one or more second frames, the data link layer payload including one or more first frames (block 520). For example, the receiver device (e.g., using processor 304, transceiver 306, and/or the like) may extract, on a data link layer, the data link layer payload from the one or more second frames, the data link layer payload including one or more first frames, as described above.

As further shown in FIG. 5, process 500 may include providing the one or more first frames to a transport layer, each of the one or more first frames including a first header and a respective portion of a transport layer payload (block 530). For example, the receiver device (e.g., using processor 304, transceiver 306, and/or the like) may provide the one or more first frames to a transport layer, each of the one or more first frames including a first header and a respective portion of a transport layer payload, as described above.

As further shown in FIG. 5, process 500 may include extracting, on the transport layer, the transport layer payload from the one or more first frames (block 540). For example, the receiver device (e.g., using processor 304, transceiver 306, and/or the like) may extract, on the transport layer, the transport layer payload from the one or more first frames, as described above.

As further shown in FIG. 5, process 500 may include processing one or more padding bits, associated with providing traffic flow confidentiality to communication of a payload on the communication bus, from either the one or more first frames on the data link layer, or the payload on the transport layer (block 550). For example, the receiver device (e.g., using processor 304, transceiver 306, and/or the like) may process one or more padding bits, associated with providing traffic flow confidentiality to communication of a payload on the communication bus, from either the one or more first frames on the data link layer, or the payload on the transport layer, as described above.

As further shown in FIG. 5, process 500 may include determining the payload based on the transport layer payload (block 560). For example, the receiver device (e.g., using processor 304, transceiver 306, and/or the like) may determine the payload based on the transport layer payload, as described above.

Process 500 may include additional implementations, such as any single implementation or any combination of implementations described below and/or in connection with one or more other processes described elsewhere herein.

In some implementations, the bus-based communication system uses one of: a CAN protocol, a CAN FD protocol, or a CAN XL protocol.

In some implementations, the receiver device is further configured to, when the one or more padding bits are processed from the payload on the transport layer, decrypt, on the transport layer, the transport layer payload; determine, on the transport layer, a payload length indicator based on a result of decrypting the transport layer payload; and process the one or more padding bits based on the payload length indicator.

In some implementations, the first header includes an indication that the transport layer payload starts with a payload length indicator when the one or more padding bits are processed from the payload on the transport layer.

In some implementations, the receiver device is further configured to, when the one or more padding bits are processed from the one or more first frames on the data link layer, decrypt, on the data link layer, the data link layer payload to determine the one or more first frames and the one or more padding bits.

In some implementations, information that identifies a length of the transport layer payload is included in the first header when the one or more padding bits are processed from the one or more first frames on the data link layer.

In some implementations, an encrypted payload length indicator is included in the second header when the one or more padding bits are processed from the one or more first frames on the data link layer.

In some implementations, a separator is used to separate the one or more padding bits from the one or more first frames when the one or more padding bits are processed from the one or more first frames on the data link layer.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 associated with providing CAN traffic flow confidentiality. In some implementations, one or more process blocks of FIG. 6 may be performed by a transmitter device (e.g., transmitter device 202, a first node 302, and/or the like) or by a receiver device (e.g., receiver device 204, a second node 302, and/or the like)

As shown in FIG. 6, process 600 may include adding one or more padding bits, associated with providing traffic flow confidentiality for communication of a payload on a communication bus of the bus-based communication system, either to the payload on a transport layer, or to one or more first frames on a data link layer, wherein the one or more first frames include a transport layer payload associated with the payload (block 610). For example, the transmitter device (e.g., using processor 304, transceiver 306, and/or the like) may add one or more padding bits, associated with providing traffic flow confidentiality for communication of a payload on a communication bus of the bus-based communication system, either to the payload on a transport layer, or to one or more first frames on a data link layer, as described above.

In some implementations, the one or more first frames include a transport layer payload associated with the payload.

As further shown in FIG. 6, process 600 may include transmitting one or more second frames on the communication bus, the one or more second frames including a data link layer payload associated with the one or more first frames (block 620). For example, the transmitter device (e.g., using processor 304, transceiver 306, and/or the like) may transmit one or more second frames on the communication bus, the one or more second frames including a data link layer payload associated with the one or more first frames, as described above.

As further shown in FIG. 6, process 600 may include receiving the one or more second frames on the communication bus (block 630). For example, the receiver device (e.g., using processor 304, transceiver 306, and/or the like) may receive the one or more second frames on the communication bus, as described above.

As further shown in FIG. 6, process 600 may include processing the one or more padding bits either from the one or more first frames on the data link layer, or from the payload on the transport layer (block 640). For example, the receiver device (e.g., using processor 304, transceiver 306, and/or the like) may process the one or more padding bits either from the one or more first frames on the data link layer, or from the payload on the transport layer, as described above.

Process 600 may include additional implementations, such as any single implementation or any combination of implementations described below and/or in connection with one or more other processes described elsewhere herein.

In some implementations, the bus-based communication system uses a CAN protocol; a CAN FD protocol, or a CAN XL protocol.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A transmitter device included in a bus-based communication system, the transmitter device comprising:
    a transmitter; and
    one or more processors configured to:
        obtain a payload to be transmitted on a communication bus of the bus-based communication system;
        generate, on a transport layer, one or more first frames based on the payload, each of the one or more first frames including a first header and a respective portion of a transport layer payload,
            wherein a last frame of the one or more first frames includes an authentication tag associated with the one or more first frames;
        provide the one or more first frames to a data link layer;
        generate, on the data link layer, one or more second frames based on the one or more first frames, each of the one or more second frames including a second header, a respective portion of a data link layer payload, and an end-of-frame indication;
        add one or more padding bits, associated with providing traffic flow confidentiality for communication of the payload on the communication bus, to:
            the payload on the transport layer, when the one or more padding bits are not added on the data link layer, or
            the one or more first frames on the data link layer, and not adding the one or more padding bits on the transport layer when the one or more padding bits are added on the data link layer; and
        transmit the one or more second frames on the communication bus.

2. The transmitter device of claim 1, wherein the bus-based communication system uses one of:
    a controller area network (CAN) protocol;
    a CAN with flexible data-rate protocol; or
    a CAN extra large protocol.

3. The transmitter device of claim 1, wherein the one or more processors are further configured to, when the one or more padding bits are added to the payload on the transport layer:
    add, on the transport layer, a payload length indicator to the payload; and
    encrypt, on the transport layer, a result of adding the payload length indicator and adding the one or more padding bits to the payload to generate the transport layer payload.

4. The transmitter device of claim 1, wherein the one or more processors are further configured to, when the one or more padding bits are added to the payload on the transport layer:
    receive, on the transport layer, information indicating a total padded payload length; and
    add the one or more padding bits to the payload based on the information indicating the total padded payload length.

5. The transmitter device of claim 1, wherein the first header includes an indication that the transport layer payload starts with a payload length indicator when the one or more padding bits are added to the payload on the transport layer.

6. The transmitter device of claim 1, wherein the one or more processors are further configured to, when the one or more padding bits are added to the one or more first frames on the data link layer:
    encrypt, on the data link layer, a result of adding the one or more padding bits to the one or more first frames to generate the data link layer payload.

7. The transmitter device of claim 1, wherein the one or more processors are further configured to, when the one or more padding bits are added to the one or more first frames on the data link layer:
    receive, on the data link layer, information indicating a total length to be transmitted on the communication bus, the information indicating the total length being received from the transport layer; and
    add the one or more padding bits to the one or more first frames based on the information indicating the total length to be transmitted on the communication bus.

8. The transmitter device of claim 1, wherein information that identifies a length of the transport layer payload is included in the first header when the one or more padding bits are added to the one or more first frames on the data link layer.

9. The transmitter device of claim 1, wherein an encrypted payload length indicator is included in the second header when the one or more padding bits are added to the one or more first frames on the data link layer.

10. The transmitter device of claim 1, wherein a separator is used to separate the one or more padding bits from the one or more first frames when the one or more padding bits are added to the one or more first frames on the data link layer.

11. A receiver device included in a bus-based communication system, comprising:
    a receiver; and
    one or more processors configured to:
        receive one or more second frames on a communication bus of the bus-based communication system, each of the one or more second frames including a second header, a respective portion of a data link layer payload, and an end-of-frame indication;
        extract, on a data link layer, the data link layer payload from the one or more second frames, the data link layer payload including one or more first frames;
        provide the one or more first frames to a transport layer, each of the one or more first frames including a first header and a respective portion of a transport layer payload;
        extract, on the transport layer, the transport layer payload from the one or more first frames;
        process one or more padding bits, associated with providing traffic flow confidentiality to communication of a payload on the communication bus, from:

the one or more first frames on the data link layer, when the one or more padding bits are added on the data link layer and not added on the transport layer, or the payload on the transport layer, when the one or more padding bits are not added on the data link layer; and determine the payload based on the transport layer payload.

12. The receiver device of claim 11, wherein the bus-based communication system uses one of:
a controller area network (CAN) protocol;
a CAN with flexible data-rate (CAN FD) protocol; or
a CAN extra large protocol.

13. The receiver device of claim 11, wherein the one or more processors are further configured to, when the one or more padding bits are processed from the payload on the transport layer:

decrypt, on the transport layer, the transport layer payload;

determine, on the transport layer, a payload length indicator based on a result of decrypting the transport layer payload; and remove the one or more padding bits based on the payload length indicator.

14. The receiver device of claim 11, wherein the first header includes an indication that the transport layer payload starts with a payload length indicator when the one or more padding bits are processed from the payload on the transport layer.

15. The receiver device of claim 11, wherein the one or more processors are further configured to, when the one or more padding bits are processed from the one or more first frames on the data link layer:

decrypt, on the data link layer, the data link layer payload to determine the one or more first frames and the one or more padding bits.

16. The receiver device of claim 11, wherein information that identifies a length of the transport layer payload is included in the first header when the one or more padding bits are processed from the one or more first frames on the data link layer.

17. The receiver device of claim 11, wherein an encrypted payload length indicator is included in the second header when the one or more padding bits are processed from the one or more first frames on the data link layer.

18. The receiver device of claim 11, wherein a separator is used to separate the one or more padding bits from the one or more first frames when the one or more padding bits are processed from the one or more first frames on the data link layer.

19. A method, comprising:
adding, by a transmitter device of a bus-based communication system, one or more padding bits, associated with providing traffic flow confidentiality for communication of a payload on a communication bus of the bus-based communication system, either:
to the payload on a transport layer, or
to one or more first frames on a data link layer, wherein the one or more first frames include a transport layer payload associated with the payload;

transmitting, by the transmitter device, one or more second frames on the communication bus, the one or more second frames including a data link layer payload associated with the one or more first frames;

receiving, by a receiver device of the bus-based communication system, the one or more second frames on the communication bus; and processing, by the receiver device, the one or more padding bits:
from the one or more first frames on the data link layer, when the one or more padding bits are added on the data link layer and not added on the transport layer, or
from the payload on the transport layer, when the one or more padding bits are not added on the data link layer.

20. The method of claim 19, wherein the bus-based communication system uses one of:
a controller area network (CAN) protocol;
a CAN with flexible data-rate protocol; or
a CAN extra large protocol.

* * * * *